July 22, 1941.   G. G. J. DRÖGE   2,249,890
PROCESS OF MAKING PORCELAIN DENTAL APPLIANCES
Filed April 4, 1939
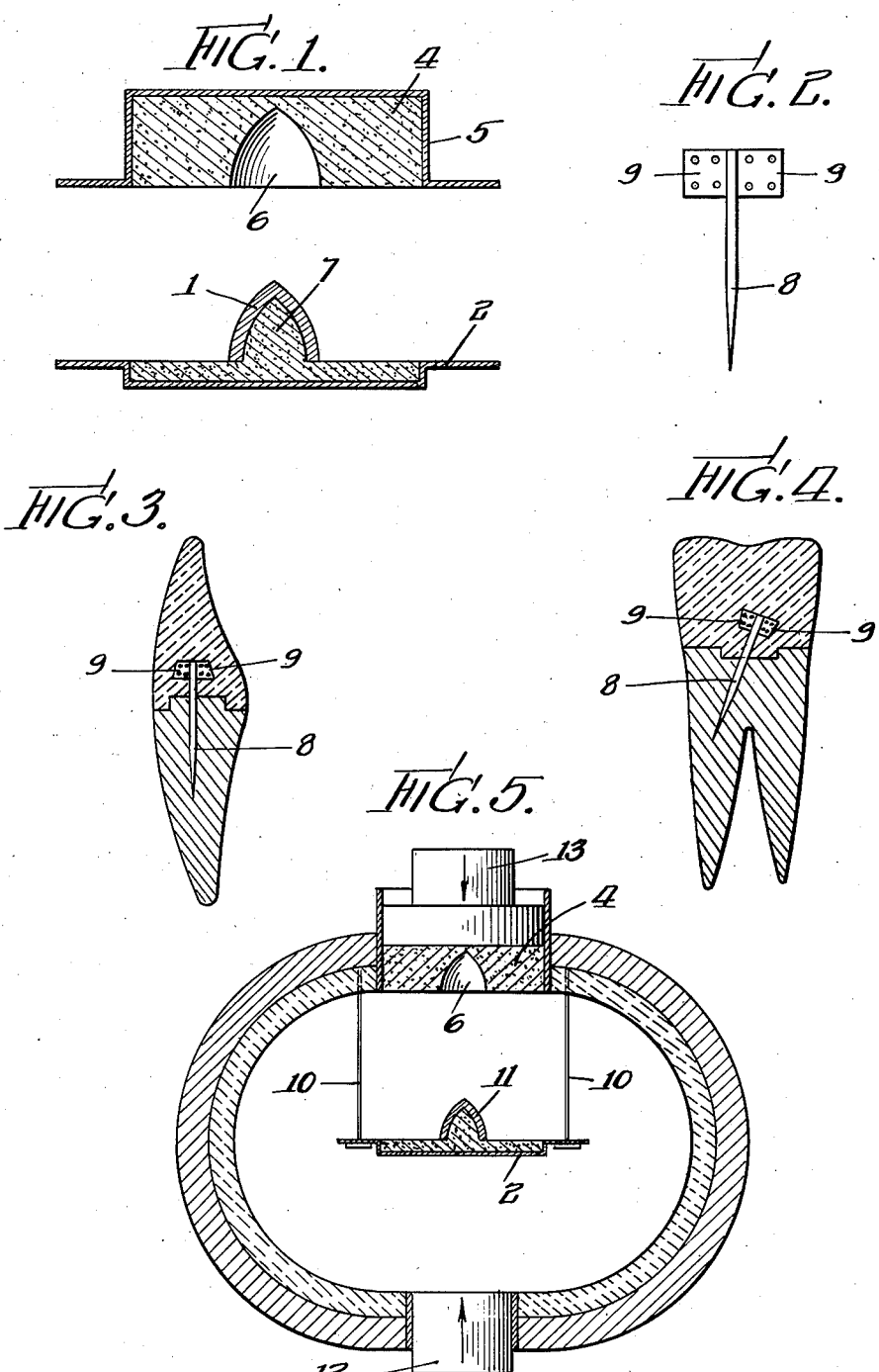
INVENTOR.
Gerard George Johan Dröge
BY: Cox Moore & Olson
attys.

Patented July 22, 1941

2,249,890

UNITED STATES PATENT OFFICE 2,249,890

PROCESS OF MAKING PORCELAIN DENTAL APPLIANCES

Gerard George Johan Dröge, Tilburg, Netherlands

Application April 4, 1939, Serial No. 265,978
In the Netherlands September 22, 1937

5 Claims. (Cl. 18—55.1)

The invention relates to a process of making individual porcelain dental appliances and to a firing oven to be used in the said process.

In the dental art hard porcelain is considered to be the ideal substitute for natural teeth and molars. Nevertheless the said porcelain is not generally used as yet, on account of the fact that the method hitherto known for handling hard porcelain requires a high degree of skill and moreover involves the use of precious metals such as platinum and platinum-iridium, whereby the dental appliances become too expensive for general use.

The said known method consists in applying and firing layers of pasted porcelain on or around a matrix made of platinum foil and shaped in accordance with the prepared molar or tooth, until a product of the desired shape has been obtained. The application and firing of the porcelain paste layer by layer has the drawback that the quality of the porcelain is impaired by the repeated firing treatments, while a great deal of caution is needed for avoiding the results of a non-uniform shrinkage of the material.

As a substitute for this difficult and expensive method it has already been proposed to resort to the use of casting-porcelain which after having been rendered completely soft is pressed into a mould the moulding cavity of which corresponds to the outer form of the desired dental appliance.

Although this method is considerably simpler than the handling of powdered porcelain it still has several disadvantages. Casting-porcelain on account of its qualitative properties is not a very suitable material for dental products. Moreover it is impossible, on account of the method followed in handling casting-porcelain to obtain the desired color shades at the outer surface of the dental appliance, since the said product during its essential formation is located inside the moulding cavity and consequently is unattainable for any further influences.

The present invention has for its purpose to render the use of casting-porcelain unnecessary and to form the more suitable hard-porcelain in a more rational manner than has hitherto been the case into the desired dental appliances, more particularly into porcelain bridges with or without supports.

For this purpose according to the invention the dental appliance if desired in combination with previously prepared parts (such as tooth facets, denture plates or parts thereof) is provisionally modelled by hand of a pasted porcelain powder; the provisionally modelled piece freely supported by a carrier is then subjected to a firing treatment over its entire outer surface and, as soon as the porcelain mass starts to become lustrous, in other words as soon as the surface has begun to soften, a previously constructed mould of which the wall surrounding the moulding cavity corresponds exactly to the outer surface of the desired dental appliance is pressed over the provisionally modelled piece.

For carrying out the said process use may be advantageously made of a firing oven in which according to the invention there are provided wire—or strip—like members for freely supporting the provisionally modelled piece with its carrier, while the wall of the oven space is provided with two recesses facing each other and in which there are provided dies movable in the said recesses, one of which dies is adapted to receive the mould with the moulding cavity for the dental appliance.

The invention will be further explained with the aid of the drawing in which some embodiments of the same are illustrated together with the means employed, and in which Fig. 1 is a vertical section of the moulds to be used for carrying out the process.

Fig. 2 is an embodiment of an attaching pin.

Figs. 3 and 4 represent possibilities of using an attaching pin of this kind.

Fig. 5 is a vertical section of a diagrammatic embodiment of the firing oven.

For the manufacture of a porcelain appliance for which a jacket crown will be taken as an example, there is first made a wax model 1 of the crown to be manufactured. (Fig. 1.) This wax model 1 is placed on the embedding mass 3 arranged in a very shallow tray 2 in such a way that only the bottom surface of the wax model 1 will be in contact with the embedding mass while the hollow core 7 of the model will be filled with the said mass.

After the embedding mass 3 has set and a separating liquid has been applied over its free surface, a second tray 5 filled with an embedding mass 4 is placed with its open side on the tray 2, so that a moulding cavity 6 corresponding to the external form of the wax model 1 i. e. of the dental appliance to be made, is formed in the embedding mass.

As soon as the embedding mass 4 has set, the two trays 2 and 5 are separated, after which the wax model is removed, e. g. by melting. The embedding mass 3 present in the tray 2 will then show an exact reproduction of the lower surface of the dental piece and with the embodiment according to the drawing which relates to a jacket crown, also of the core 7.

After the said lower surface and also the surface of the core have been covered with a separating liquid, the desired dental appliance is modelled in pasted porcelain powder on the bottom surface and around the core. During this modelling treatment which is only of a provisional character and therefore need only be carried out with approximate accuracy, it will also be possible to apply pasted porcelain layers of different colors in connection with the color shade required in the finished product, both side by side and the one over the other. In order to compensate for the shrinkage which will occur during further treatment, modelling is carried out with an excess of porcelain.

The tray 2 with the provisionally roughly modelled piece is now placed into an oven where the piece located freely on the tray 2 is subjected to firing over its entire outer surface.

As soon as the porcelain mass starts to become lustrous and consequently has only begun to be soft at the outside, the tray 5 with the embedding mass 4 provided with the moulding cavity 6 is placed on the tray 2, the moulding hollow 6 being pressed over the provisionally modelled piece. The piece thereby is brought exactly into the desired shape, while at the same time owing to a uniform pressure exerted on all sides by the wall of the moulding cavity 6, all pores present on the surface of the dental appliance are closed up. Thereby the bottom surface of the piece is moulded with the utmost accuracy, as it is required for a correct joining of the edges with those of the tooth- or molar portion for which the dental appliance is intended.

For the making of bridges, for which the process according to the invention is particularly suitable, an impression is made of the teeth still present in the mouth which form the pillars for the bridge piece and of the space between the said pillars which is to be bridged. On the cast of the said impression the bridge is then carefully modelled in wax. This wax model is then placed on a tray having a depth of about 1 millimeter and which is filled with an embedding mass. As soon as the embedding mass has set, it is coated with a separating liquid after which the wax model is pressed into an embedding mass present in a second, deeper tray. After the mass in the second tray has set, this mass will form the matrix for the bridge to be made. The wax model is then removed from the first tray, after which on the said tray the bridge to be made is provisionally modelled from pasted porcelain powder, the porcelain paste being applied in the right color variations in order to obtain the desired shade of coloring.

The bridge thus provisionally modelled is then finished in the manner described above by means of firing and with the aid of the matrix located in the second tray.

In this manner a bridge of hard-porcelain made all in one piece is obtained, which it had not been possible to accomplish up to the present.

A bridge of this kind may also be combined to advantage with a metal support previously made on which the said bridge is afterwards secured by means of cement. Owing to the fact that the use of precious metals is unnecessary in this process, a considerable saving is obtained. Moreover there is no danger that tensions occurring between the metal and the porcelain will cause a breakage of the bridge piece. Furthermore in case of ruptures of the porcelain bridge from other causes the metal supports may remain in their places while the ruptured bridge is replaced by new one.

In many cases the dental appliance, if this consists of an individual crown, must be provided with a pin for attaching the said crown to the portion of the tooth or molar which still remains in the mouth. In connection with the manner in which a piece according to the invention is made, such a pin will have to fulfill special requirements in order to obtain as reliable as possible a connection between the pin and the dental appliance.

According to the invention this purpose may be obtained by providing the pin 8 with radial wings 9 (Fig. 2) the surface of which preferably has been roughened by perforating the same or in some other manner. In connection with the special purpose of the said wings they may be trimmed as shown in Figs. 3 and 4. Since with the process according to the invention there is no danger of pores being formed during the manufacture of a dental appliance provided with a pin,—as is the case in the known processes— it will be possible to use pins of ordinary metals instead of precious metals which must be used in the known processes.

Hitherto mention has only been made of appliances modelled entirely of pasted porcelain. In many cases, however, it will be advantageous when making a dental appliance to use previously made parts such as tooth facets, denture plates which are then filled out with a porcelain paste and are made into the desired appliance in the manner according to the invention. Tooth facets particularly suitable for this purpose are provided with a concave back without any undercuttings. In tooth facets of this kind it is certain that the supplementary porcelain portion of the tooth will be attached without any hiatus over the entire rear surface of the facet.

The success of the production of appliances according to the invention depends to a large degree on the possibility of creating and maintaining a sufficiently high temperature in the oven in which the piece is to be fired for rapidly heating the piece. For this reason it is advisable to use an oven constructed in accordance with the principle demonstrated in Fig. 5. According to the said figure there are provided in the oven wall the inner side of which is covered with a refractory material a pair of thin wire shaped supports 10 from which the tray 2 with the appliance 11 modelled on the same is detachably suspended. Above and below the place for the tray 2 there is provided in the oven wall a recess in which dies, 12 and 13 respectively, are fitting. The die 13 is adapted for receiving the matrix for finishing the appliance, which matrix consists of the embedding mass 4 with the moulding cavity 6 formed therein.

The dies 12 and 13 during the firing of the appliance will be in the position illustrated in Fig. 5, so that during the said firing process the oven space will be free from material which will absorb excess heat or along which heat will be conducted outside of the oven. In other words, by eliminating thick, sectional supports and parts which excessively absorb heat and convey it exteriorly of the furnace, the present device is adapted to permit rapid heating of the entire outer surfaces of the piece, such that the surfaces become soft and lustrous due to incipient fusion before the central portions have softened.

If the piece has been sufficiently heated, the die 12 is first moved upwardly for supporting the tray 2, after which the die 13 is moved downwardly for the purpose of pressing the matrix with the moulding cavity 6 over the piece 11.

The process according to the invention produces excellent biological and cosmetical results and moreover has the advantages that because of the fact that heat is applied only once and in a very uniform manner, the quality of the porcelain remains intact and the desired shades of color may be produced very accurately, while the process may be carried out in a very simple manner and does not require any special skill or dexterity. By applying the present invention it becomes possible to employ the kinds of porcelain having a high melting point, in contradistinction to the known pressing or casting methods in which only the readily fusible so-called casting porcelain can be used, which casting porcelain, however, has all kinds of drawbacks, since it cannot be glazed, is not adapted to producing different shades of color, is unsuitable for bridge work and moreover is a material of insufficient strength in which no pins can be secured.

I claim:

1. The process of making hard, porcelain denture appliances which comprises arranging a provisionally modeled denture in a furnace and supported on a carrier so that its outer surfaces are exposed to the elevated temperature of the furnace, said denture comprising a mass of pasted, porcelain powder provisionally modeled to substantially the form of the final denture, holding said denture in said furnace until the outer surface portions only become initially soft and lustrous, bringing a remotely positioned mold into engagement with said provisionally modeled appliance and subjecting said appliance to pressure to cause the appliance to conform exactly to the outer surface of the predetermined dental appliance to be prepared.

2. In the process of making a hard porcelain denture appliance, the steps which comprise provisionally modeling the denture to substantially the form of the final desired product from a mass of pasted porcelain powder, subjecting the provisionally modeled piece to high temperature under conditions such that the outer surface portions of the provisionally modeled mass are heated much more rapidly than the interior thereof, continuing to subject said mass to said heating conditions until the outer surface portions only of said mass have reached a temperature where they have just become incipiently soft and lustrous, then pressing a previously constructed mold having a molding surface corresponding exactly to the outer surface of the final denture over the fired piece, and thereafter discontinuing the heating to produce a hard porcelain product of predetermined form.

3. In the process of making a hard, porcelain denture appliance, the steps which comprise building up a shape corresponding substantially to the form of the desired final product from pasted, high melting point, porcelain powder, said building up including applying layers of said pasted powder of different colors to get a desired final shade, subjecting the piece so built up to a single heat treatment at high temperature under conditions such that the outer surface portions of the provisionally modeled mass are heated much more rapidly than the interior thereof, continuing to subject said mass to said heating conditions until the outer surface portions only of said mass have reached a temperature where they have just become incipiently soft and lustrous, then pressing a previously constructed mold having a molding surface corresponding exactly to the outer surface of the final denture over the fired piece, and thereafter discontinuing the heating to produce a hard, porcelain product of predetermined form.

4. The process of making a hard porcelain denture appliance as defined in claim 2, wherein the provisionally modeled mass of porcelain comprises high melting point porcelain powder.

5. The process of making a hard porcelain denture appliance as defined in claim 2, wherein the provisionally modeled piece is subjected to high temperature conditions on all sides while supported by relatively thin sectional supporting means incapable of substantially absorbing heat and operative to permit rapid uniform heating of the entire outer surfaces of the piece.

GERARD GEORGE JOHAN DRÖGE.